United States Patent [19]
Mazur

[11] 3,832,072
[45] Aug. 27, 1974

[54] CLAMP ASSEMBLY
[75] Inventor: Sylvester Stanislaus Mazur, Detroit, Mich.
[73] Assignee: TRW Inc., Cleveland, Ohio
[22] Filed: Apr. 23, 1973
[21] Appl. No.: 353,906

[52] U.S. Cl. ............................................... 403/46
[51] Int. Cl. ............................................ F16b 7/06
[58] Field of Search ............. 403/43, 44, 45, 46, 47, 403/48, 343

[56] References Cited
UNITED STATES PATENTS
| | | | |
|---|---|---|---|
| 2,526,470 | 10/1950 | Gauthier | 403/46 |
| 2,644,702 | 7/1953 | Graham | 403/43 |
| 2,895,756 | 7/1959 | Gair | 403/343 |

FOREIGN PATENTS OR APPLICATIONS
| | | | |
|---|---|---|---|
| 521,126 | 1/1956 | Canada | 403/43 |
| 633,344 | 12/1949 | Great Britain | 403/343 |

Primary Examiner—Werner H. Schroeder
Attorney, Agent, or Firm—Hill, Gross, Simpson, Van Santen, Steadman, Chiara & Simpson

[57] ABSTRACT

The location of a draw bolt clamp on an adjusting sleeve assembly for tie rods of automotive steering linkages is controlled by a tab on the slotted tube of the assembly projecting into a slot in the clamp to hold the clamp against axial shifting on the tube and to prevent rotation of the loose clamp to a position where any portion of the clamp could enter the tube slot when the clamp is tightened on the tube. The assembly may be in the form of an internally threaded tube with a slotted threaded rod receiving end portion and receiving the clamp therearound or in the form of a split turnbuckle receiving clamps on both ends and having internal threads of opposite hand each receiving a threaded rod.

12 Claims, 4 Drawing Figures

PATENTED AUG 27 1974 3,832,072
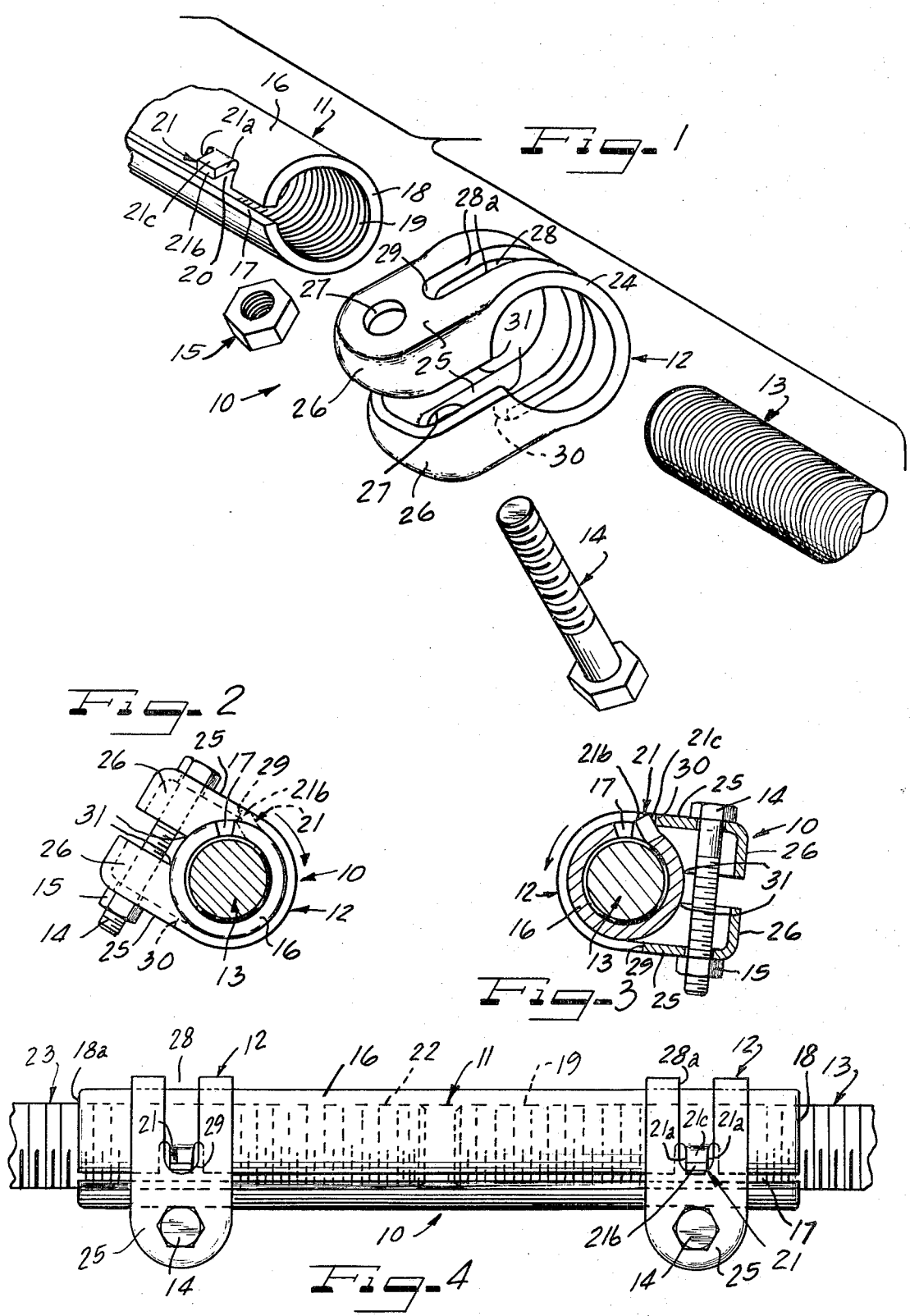

CLAMP ASSEMBLY

FIELD OF THE INVENTION

This invention relates to the art of controlling the location of a clamp on a circumferentially contractible tube and particularly deals with adjusting sleeve or turnbuckle assemblies for tie rods of automotive steering linkages.

DESCRIPTION OF THE PRIOR ART

Slotted adjusting sleeve or turnbuckle assemblies with clamp locators are known in the prior art as for example in the Gauthier U.S. Pat. No. 2,526,470; the Booth U.S. Pat. No. 2,696,397; and the Gair U.S. Pat. No. 2,895,756. These assemblies had protuberances projecting from the slotted tube of the assembly in spaced relation from the tube slot and permitted a portion of the clamp to enter the tube slot where it could interfere with contraction of the tube.

SUMMARY OF THE INVENTION

This invention now provides a clamp assembly accommodating limited rotation of a loose U-shaped draw bolt clamp on a slotted tube in such a manner that the clamp cannot shift axially out of position on the tube nor can it rotate to a position where a leg portion will interfere with proper contraction of the tube.

According to the invention, a longitudinally slotted internally threaded tube or turnbuckle body is lanced at one side of the slot and an ear or tab between the lance cuts is punched outwardly to form a protuberance on the tube. A U-shaped clamp is provided with a central elongated closed end slot around the bight portion thereof receiving the ear or tab in slidable relation. The clamp can thus rotate on the tube to the extent permitted by the length of the slot since the ear or tab will abut the ends of the slot to limit the rotation. Usually about 180° of rotation is permitted.

The legs of the U-shaped clamp have the conventional inwardly turned flanges around their peripheries to stiffen the legs against bending when the draw bolt projecting through the legs is tightened to contract the bight portion of the clamp on the tube. These flanges have corners at the bight portion of the clamp which could project into the slot of the tube when the clamp is tightened on the tube. The projecting of such corners into the slot of the tube interferes with contraction of the tube. However, according to this invention, the ear or tab on the tube will abut the ends of the slot in the bight portion of the clamp before the corners of the leg flanges can be rotated to a position over the slot of the tube. Then, when the clamp is contracted, these corners of the leg flanges will be spaced circumferentially from the slot and will not interfere with contraction of the tube. At the same time, the ear or tab, riding in the slot of the clamp, will prevent axial shifting of the clamp on the tube.

Therefore, this invention provides a single protuberance on an adjusting sleeve or turnbuckle body which locates a clamp assembly both axially and circumferentially to insure efficient clamping of the tube on an inserted threaded rod or the like.

It is then an object of this invention to provide a clamp assembly where the clamp is located both axially and circumferentially on a slotted tube to insure the most effective clamping action.

Another object of the invention is to control the location of a clamp on an adjusting sleeve assembly such as used on tie rods of automotive steering linkages by projecting a tab from the tube of the assembly into a circumferential slot of the clamp of the assembly in such a manner that the clamp is held against axial shifting on the tube and has only limited rotation on the tube to prevent any portion thereof from projecting into the slot of the tube.

Another object of the invention is to provide a longitudinally slotted adjusting sleeve with an outturned tab on one side of the slot thereof and a clamping ring having a circumferential recess receiving the tab and cooperating therewith to hold the clamp against axial shifting while permitting rotation through a limited arc which will prevent projection of the clamp legs into the slot.

A specific object of the invention is to provide a clamp and tube assembly with means preventing axial movement of the clamp along the tube while permitting about 180° of rotational movement of the clamp on the tube and holding any portion of the clamp which could project into the slot of the tube in spaced relation from this slot.

Another specific object of this invention is to provide a turn-buckle or adjusting sleeve for automotive steering linkages which has a longitudinally split internally threaded metal tube with a gap along the length thereof, a pair of U-shaped clamps on the ends of the tube, and tabs punched out from the tube seated in circumferential slots in the clamps to locate the clamps both axially and circumferentially on the tube for effective contraction of the tube on rods threaded therein when the clamps are tightened.

Other and further objects of this invention will be apparent to those skilled in this art from the following detailed description of the annexed sheet of drawings which, by way of a preferred example only, illustrates one embodiment of the invention.

ON THE DRAWINGS

FIG. 1 is a fragmental exploded isometric view of the components of a clamp assembly according to this invention;

FIG. 2 is an end elevational view of the clamp assembly of this invention, with a portion in cross section, showing the limit of clockwise rotation of the clamp on the tube of the sleeve assembly;

FIG. 3 is a view similar to FIG. 2 but showing the limit of rotation of the clamp in a counterclockwise direction on the tube;

FIG. 4 is a fragmentary longitudinal view of the clamp assembly of this invention.

BRIEF DESCRIPTION OF THE PREFERRED EMBODIMENT

The assembly 10 of FIGS. 1 to 4 includes a tube or turnbuckle body 11, a U-shaped clamping ring 12, a threaded rod 13 for threading in the tube 11, a draw bolt 14, and a nut 15 into which the draw bolt is threaded.

The tube 11 has a cylindrical metal body 16 with a longitudinal slot 17 extending inwardly from the free end 18 thereof, an internal thread 19, and a lanced portion 20 on one side of the slot 17 from which protrudes a tab or ear 21. The tube body 16 may have the slot 17 extend along the full length thereof or only for a limited portion of the length of the tube. If the body 16 is a turnbuckle or adjusting sleeve, the thread 19 extending inwardly from one end thereof extends only about half the length of the tube as shown in FIG. 4, a second thread 22 of opposite hand from the thread 19 extends inwardly from the other end 18a of the tube body, a second rod 23 is threaded into this opposite end 18a of the tube and a clamp 12 is located on both ends of the tube.

The clamp 12 is a metal ring of generally U-shape configuration with a circular bight portion 24 for embracing the tube body 16 and a pair of spaced depending legs 25 each surrounded by an inturned peripheral flange 26 reinforcing the legs against bending. Each leg has an aperture 27 near the free end thereof for receiving the draw bolt 14.

A circumferential slot 28 is provided centrally in the bight portion 24 of the clamp 12 and has ends 29 and 30 at the inner ends of the legs 25. The slot 28 could be in the form of a groove in the inner wall of the bight portion 24 and the term "slot" as used herein is intended to include such grooves.

As best seen in FIG. 1, corners 31 occur between the bight portion 24 and the inboard ends of the leg flanges 26. These corners can enter the slot 17 to interfer with contraction of the tube body 16 if they are permitted to overlie the slot 17.

When the clamp 12 is loosely mounted on the tube body 16, the ear or tab 21 is received in the slot 28 of the bight portion of the clamp. The sides 21a of the ear 21 will ride on the sides 28a of the slot 28 of the clamp and the free end 21b of the ear can abut the end 29 of the slot 28 while the outside face 21c of the ear can abut the end 30 of the slot 28.

The loose clamp is therefore held against axial shifting on the tube body 16 and can rotate circumferentially on the tube through an arc limited by the length of the slot 28. Thus, as shown in FIG. 2, when the clamp 12 is rotated in a clockwise direction, the end 29 of the slot will abut the end edge 21b of the ear to limit further rotation. On the other hand, as shown in FIG. 3, when the clamp 12 is rotated in a counterclockwise direction on the tube body 16, the end 30 of the slot will abut the outside face 21c of the ear to limit further rotation. About 180° of rotation of the clamp on the tube body is thereby permitted. The amount of rotation, of course, will depend on the length of the slot 28.

As shown in FIG. 2, the corners 31 of the leg flanges 26 cannot reach the slot 17 when the clamp is rotated clockwise to the full extent permitted by the end 21b of the ear 21 and the end 29 of the slot 28. Likewise, as shown in FIG. 3 these corners 31 cannot reach the slot 17 when the clamp 12 is rotated to the full extent of its counterclockwise movement because the outer face 21c of the ear 21 will abut the end 30 of the slot 28 before these corners can overlie the tube slot 17. Therefore, the corners 31 are always held in circumferentially spaced relation from the slot 17 of the tube body 16 and cannot interfere with contraction of the tube onto the inserted threaded member 13 and 23 (if provided).

In the completed assembly of FIG. 4, the draw bolts 14 are inserted through the holes 27 of the legs of both clamps 12 and the nuts 15 are threaded on the projecting ends of the bolts. The clamps 12 with the draw bolts loosely assembled therein are loosely disposed on the ends of the tube body 16 receiving the ears 21 in the slots 28. The sleeve or tube 16 is then threaded on the rods 13 and 23 drawing the rods together as desired. The rods project into the tube to depths beyond the located clamps 12. The draw bolts 14 are then tightened in the nuts 15 to draw the legs 25 of the clamps toward each other. This will contract the bight portions 24 of the clamps around the tube body 16 causing the tube body to contract around the inserted rods 13 and 23 thereby locking the rod and tube threads against relative movement.

Of course, the tube body 16 need only have a slotted end portion receiving only a single rod 13 with a single clamp 12 located around this slotted end portion.

From the above descriptions it will therefore be clear that this invention improves the art of locating clamps on slotted tubes.

I claim as my invention:

1. An adjusting sleeve and clamp assembly comprising a tubular member having a slotted portion adapted to be contracted, a clamping ring surrounding said slotted portion having opposed clamping legs and a bight portion connecting said legs, said bight portion having a circumferential slot with closed ends, said tube having an external protuberance extending into said slot and cooperating with the sidewalls of the slot to hold the clamp against axial shifting on the tube and with the ends of the slot to hold the leg portions of the clamp in spaced circumferential relation from the slot of the tube, and a draw bolt extending through the legs of the clamp for contracting the clamp on the tube.

2. The assembly of claim 1 wherein the protuberance is a tab projecting from one side edge of the slot.

3. The assembly of claim 1 wherein the legs of the clamp have inturned peripheral flanges forming corners at the bight portion and the protuberance and ends of the slot in the clamp cooperate to hold the corners in spaced circumferential relation from the slot of the tube.

4. The assembly of claim 1 wherein the tube is internally threaded and a rod is threaded in the tube to a depth beyond the clamping ring.

5. The assembly of claim 1 wherein the tube is split along its length to provide the slot, has internal threads of opposite hand extending inwardly from both ends, and has a clamping ring located on each end.

6. The assembly of claim 2 wherein an end edge of the tab abuts one end of the circumferential slot and an outer face of the tab abuts the other end of the circumferential slot to limit rotation of the clamping ring.

7. The assembly of claim 1 wherein the protuberance and circumferential slot limit the rotation of the clamping ring on the tube to about 180°.

8. The assembly of claim 2 wherein the tab is between two circumferential cuts in the tube extending from one side of the slot of the tube.

9. A turnbuckle comprising a metal tube having a slot along the length thereof, internal threads of opposite hand extending inwardly from both ends of the tube, a U-shaped clamping ring on each end of the tube having a bight portion with a closed end circumferential slot and legs extending from the bight portion having peripheral inturned stiffening flanges extending to corners at the bight portion, a tab punched from the tube into each circumferential slot of the clamping rings, the outboard ends of the legs of the clamping rings having aligned apertures therethrough, draw bolts in said apertures, nuts on the draw bolts, and the said tabs and circumferential slots holding the clamping rings against axial shifting on the tube and limiting rotation of the clamping rings on the tube to a zone preventing the corners from overlying the slot of the tube.

10. The turnbuckle of claim 9 wherein the zone of rotation of the clamping ring is about 180°.

11. The turnbuckle of claim 9 wherein the tabs are punched from one side of the slot.

12. The turnbuckle of claim 9 wherein rods are threaded in both ends of the tube to depths beyond the clamping rings.

* * * * *